United States Patent [19]

Lofgren et al.

[11] 4,342,270
[45] Aug. 3, 1982

[54] DIGGING AND PLANTING MACHINE

[75] Inventors: Stig-Gunnar Lofgren, Jarved; Bo G. Ekeborg, Bonassund, both of Sweden

[73] Assignee: Mo och Domsjo Aktiebolag, Ornskoldsvik, Sweden

[21] Appl. No.: 264,992

[22] Filed: May 18, 1981

[30] Foreign Application Priority Data

Jun. 25, 1980 [SE] Sweden .................................. 8004686

[51] Int. Cl.³ .................................................. A01C 11/00
[52] U.S. Cl. ........................................... 111/1; 111/2; 340/684
[58] Field of Search .................................... 111/1–3; 172/518; 340/684

[56] References Cited

U.S. PATENT DOCUMENTS

| | | | |
|---|---|---|---|
| 3,931,774 | 1/1976 | Bradley | 111/3 |
| 3,943,863 | 3/1976 | Leonard et al. | 111/2 |
| 3,998,171 | 12/1976 | Lofgren et al. | 111/2 |
| 4,067,268 | 1/1978 | Lofgren et al. | 111/2 |
| 4,069,774 | 1/1978 | Lofgren et al. | 111/3 |
| 4,112,857 | 9/1978 | Bradley | 172/518 X |
| 4,122,974 | 10/1978 | Harbert et al. | 111/1 X |
| 4,149,163 | 4/1979 | Fathauer | 340/684 |
| 4,209,109 | 6/1980 | Curl et al. | 111/1 X |
| 4,273,056 | 6/1981 | Lofgren et al. | 111/2 |

*Primary Examiner*—James R. Feyrer

[57] ABSTRACT

A digging and planting machine is provided having a tubular digging and planting tool mounted on a vehicle travelling along the ground surface, and at least one sensing and signalling means for sensing the resistance of the ground to penetration by the digging tip of the tool, thus gauging the condition of the ground, and detecting obstacles to such penetration, so as to ensure that the digging tip provides and a plant is fed to a planting hole of the desired depth, when ground condition is suitable, and, when ground condition is not suitable, that new digging attempts continue to be made at closely-spaced intervals as the vehicle travels over the ground until a planting hole of the desired depth is dug, so as to plant as many plants as close together as desired per unit area.

23 Claims, 5 Drawing Figures

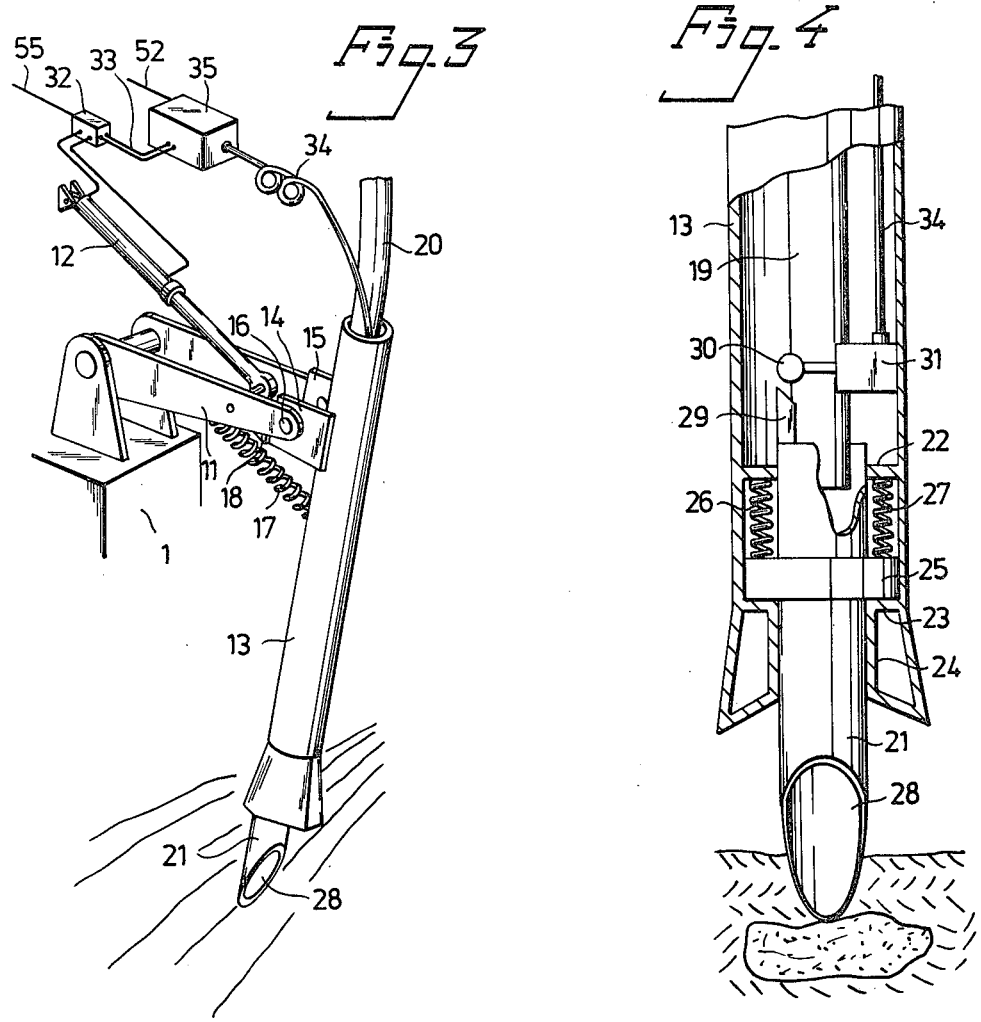

DIGGING AND PLANTING MACHINE

Planting machines are now widely used in reforestation of cut or burned over or otherwise barren forest land. Frequently, however, the machines fail to set the plants in deeply enough, and as a result the plants do not grow well and may die. This problem is due to the presence of obstacles in the ground, such as stones, stubs, large roots and the like, which prevent the digging devices of the planter from penetrating deeply enough into the ground.

Other problems arise if the plant is planted in sandy soil, or in soil that is wet or even muddy. In such cases, the plant may die because the soil conditions are unsuitable for growth.

There are two main types of reforestation or planting machines: those provided with tubular hole-making devices, and those provided with tubular plowing devices, which dig a furrow that has the hole at a deep end or portion thereof. Both of these devices operate intermittently. The tubular plowing device has a number of serious disadvantages. Such devices take longer to plow a hole and plant a plant than the short time, from 2 to 4 seconds, allotted for each single planting operation, due to the fact that the feed-out end of the planting tool is either substantially planar or slightly V-shaped. Consequently, the planting means, despite its simultaneous forward movement, encounters a high degree of resistance when moved into the ground.

To ensure that each plant is set to a proper depth, it is necessary to measure accurately the depth of the hole in which the plant is to be set, and transfer the plants from the machine to a hole only when the hole is deep enough. Devices for measuring or sensing the depth of a hole in which a plant is to be set are normally constructed so that the digging tool itself measures the depth of the hole, with the surface of the ground as a reference surface for a slide shoe or the like connected with said digging tool, and moved along said surface of the ground. However, such a device can give a signal for transferring a plant from the planting apparatus to the intended hole when the hole is too shallow, if the slide shoe becomes positioned at a higher level than the ground, on a raised stone or some other obstacle at the same time as the digging tool digs into the ground. In such a case the vertical distance between the uppper surface of the obstacle and the point of the digging tool is the sum of the elevation of the object above the ground and the resulting depth of the hole, and the correct depth is signalled when the hole is too shallow.

The planting device upon being moved into the ground also may rest on a branch or the like extending in the direction of movement by the planting machine, when the planting apparatus is preceded along its forward movement path by a ground-preparing scarifying wheel or the like. Branches picked up by the wheel are moved to beneath the planting device, thereby delaying the insertion of said device into the ground, so that a plant is either fed from the planting machine too early, or not at all.

Another disadvantage of tubular plowing devices is that, even when the devices are arranged to be inserted into the ground with an oblique, downward movement, the earth tends to penetrate the plant exit opening of the planting device, and makes feeding of the plants through the opening difficult. The reason why earth penetrates the planting tube is that the downwardly facing opening of the tubular planting device is either substantially horizontal or is inclined to the surface of the ground at an angle which is smaller than the angle formed between the movement path of the planting device and the surface of the ground.

In accordance with U.S. Pat. No. 3,998,171, patented Dec. 21, 1976, to Lofgren and Moberg, a planting machine is provided having a pneumatic depth indicator on the digging tool and comprising at least one gas conduit for conveying a gas under super-atmospheric pressure from one end to the other end thereof, the one end being connected to a gas supply source, and the other end being open to atmosphere and spaced a distance from the digging tool end equal to the depth of the hole dug by the tool for a plant, the other end being so arranged that the opening to atmosphere is plunged into blocking contact to the earth when the predetermined hole depth is reached, thereby halting flow of gas from the conduit.

A further problem with some types of tubular plowing devices having an open digging tip end is, that a plant cannot be placed in the tube until the planting site has been selected by the operator, and the tube is located over it. Since many suitable planting sites are not greater than about 0.5 to 1 m$^2$ in area, at excessive vehicle speeds the planting tube is liable to pass the planting site, or to be located over a place where the depth of earth is not favorable, before the plant can be delivered from the tube. To reduce this risk, it has been necessary to drive the machine at a relatively low forward speed, which greatly reduces the planting capability of the machine.

Another problem is that the open tip end of the tool can strike hard against stones and other obstacles in the ground, resulting eventually in a sufficient deformation of the tip end to render it unserviceable. This has limited the speed at which the planting tool can be inserted into the ground.

In accordance with U.S. Pat. No. 4,060,043, patented Nov. 29, 1977 to Lofgren, a planting machine is provided which reduces the distance through which a plant must travel at the actual moment of planting, and increases the speed at which the digging and planting tube can dig a hole and plant a plant without danger of obstruction. The digging and planting machine according to that invention comprises at least one tubular digging and planting tool, movable between ground-contacting and ground-elevated positions, and having an open digging and planting tip end; closure means movable between a first position closing off the open end for digging a hole and a second position exposing the open end for delivery of a plant from the planting tool into the hole; and means for compacting earth around the plant after planting.

The closure means makes it possible to retain a plant in the tool at the exit opening while a hole is being dug by the tool, so that a plant can be held in a position of readiness, adjacent the exit opening, for delivery to the hole as soon as it is dug. Because of the relatively short path through which the plant has to move when discharged from the tool, the machine can be advanced at a relatively high speed, without risk of the plant landing outside the planting site when the closure is opened, and it is discharged from the tube.

Furthermore, since the exit opening of the tube is closed while the tip is digging a hole, earth, stones, wood and other objects cannot enter the tube, and obstruct delivery of the plant to the hole.

In a variation of these devices, U.S. Pat. No. 4,067,268 patented Jan. 10, 1978 provides a digging and planting machine having a tubular digging and planting tool, and means for compacting earth around the plant after planting, movable between ground-contacting and ground-elevated positions, the compacting means carrying the tubular digging and planting tool, and being movable into an earth-compacting position when the digging and planting tool is in a ground-elevated position.

A further problem arises from variations in the lay of the land. The surface of the ground is normally uneven, with hollows and mounds or upstanding stones and the like, all within the span of the wheels and the wheelbase of the vehicle. This means that if the height of the vehicle above the ground constitutes a reference level for hole-digging operations, the plants may be planted at a depth which is either too shallow or too deep.

Consequently, it has been suggested that either before or at the same time as the planting device is inserted into the ground a separate sensing device establish the lay of the ground at the planting site, in relation to the vehicle and the digging tool. Then, the subsequent digging operations can be determined, and the planting device actuated accordingly. This poses a new difficulty, since the sensing device may encounter a stone, a thick branch, or some other obstacle which projects out of the ground, thereby erroneously indicating the upper surface of the obstacle as the surface of the ground. As a result the subsequent digging operations are premature so that the plant is planted at a depth which is too shallow.

U.S. Pat. No. 4,069,774, patented Jan. 24, 1978, overcomes this difficulty by providing a digging and planting machine having a tubular digging and planting tool, and at least two surface-detecting and signalling means for sensing the surface of the ground adjacent the digging tip of the tool, preferably on opposed sides of the digging tip, thus gauging the lay of the surface, so as to ensure that the digging tip provides and a plant is fed to a planting hole of the desired depth. The surface-detecting and signalling devices are interconnected so that at least two devices must be in contact with the ground or obstacles thereon, so as to ascertain the lay of the ground prior to or during the insertion of the planting device thereinto.

Since the apparatus is provided with surface-detecting means, premature or late digging due to the presence of obstacles projecting from the surface of the ground and hollows therein when using the level of the vehicle as a reference level is prevented. A plurality of such ground surface-detecting devices preferably on opposed sides of the digging and planting tool, which must co-act for digging and planting, detect the surface on each side, and reduce the risks of errors, inasmuch as the probability of each of a plurality of ground sensing devices being located detecting an obstacle on the ground surface while the planting device is able to pass into the ground unimpeded by the obstacle is relatively small, and considerably smaller than in the case where only one ground-detecting device is provided.

Despite these improvements, however, there is still no digging and planting machine that can quickly enough abort a hole-digging operation when frustrated by an obstacle or other cause and dig another hole in a closely adjacent but suitable location, so as to avoid an unduly large spacing of the plants. The problem arises from the continued forward movement of the vehicle on which the machine is mounted while these operations are taking place.

In woodland, obstacles such as stones, tree stumps and roots are so abundant that only about 40% of the ground is suitable for planting. The small areas suitable for planting do not normally exceed 0.5 to 1 $m^2$, and are scattered among concentrations of such obstacles. Hence, if an obstacle is encountered by the digging and planting tool, another hole-making attempt must be made before the vehicle has moved too far, and as quickly as possible, so that the vehicle can travel at a relatively high speed, since the speed of the vehicle largely determines the planting capacity of the apparatus. Accordingly, planting machines which can sense the planting depth are provided with a time relay. The depth sensing device initiates the feeding of a plant from the magazine where the planting tool has reached the intended depth, while the time relay interrupts a hole-making attempt if after a fixed time interval the device has failed to complete the hole, and signals associated control means to attempt a new hole. Thus, the delay time interval of the time relay must be of such a duration as to allow enough time for the planting device during its downward movement to penetrate the earth to the desired planting depth, and also to move through the distance from its starting position above the surface of the ground to its position of first contact therewith. Since virgin forest ground is extremely uneven, with numbers of gulches and hollows, the distance through which the digging and planting tool must move in order to reach the surface of the ground is correspondingly longer, and the delay time must consequently accommodate this.

Since the time delay governs the time that must elapse before a new hole is dug, if the ground is so hard, or so covered with roots, or an obstacle is struck, that the planting tool is unable to penetrate the earth to the desired depth, the tool remains inoperative until this time has expired. This is a waste of time, since the device should be withdrawn from the ground and a new attempt made as soon as its downward movement is stopped.

When planting in virgin woodland, the time relay is normally set at a time delay interval of about 0.8 second, starting from the moment at which the planting device begins its descent. Of this time interval, approximately 0.4 second represents the maximum time the planting tool requires, at a normal descent rate of about 1.5 m/second, to move from its upper at-rest position to the contact with the surface of the ground, while approximately 0.1 second is needed for the planting tool to penetrate the ground to the predetermined planting depth. The remainder of the delay time of approximately 0.3 second is the time required for the planting tool to penetrate to the desired planting depth, even if the ground is somewhat difficult to penetrate, or lies in a deep hollow or rut.

Thus, when the planting tool strikes an obstacle in its downward movement, a time lapse of about 0.4 second is normal between the time the downward movement ceases and the planting tool is moved away from the ground. In addition to this, about 0.2 second is taken to raise the planting tool approximately halfway to the upper at-rest position, to an intermediate position above the surface of the ground, and an equal length of time to return the tool into contact with the ground for a further hole-making attempt. The total time required for the planting tool to reach the ground in a further hole-forming attempt can thus be approximately 0.8 second. During this time, the vehicle moves forward a distance of from 0.4 to 0.5 meter, at a normal driving speed of 2 km/hour. Consequently, the time consumed in initiating a further hole-forming attempt not only means a loss in time but also spaces the plants too far apart with an unnecessary waste of productive ground.

U.S. Pat. No. 4,273,056, patented June 16, 1981 Ser. No. 40,355, filed May 18, 1979, overcomes the elapsed time problem by providing a digging and planting machine having a tubular digging and planting tool, and at least one sensing and signalling means for sensing a resistance below and/or exceeding a predetermined minimum to penetration of the ground by the digging tip of the tool, or its equivalent, thus gauging the condition of the ground, and detecting obstacles to such penetration so as to ensure that the digging tip provides and a plant is fed to a planting hole of the desired depth, and controlling the raising and lowering of the digging and planting tool towards and away from the ground so that the digging and planting tool makes another hole-digging attempt as soon as an attempt is aborted. U.S. Pat. No. 4,273,056 is incorporated herein by reference.

This digging and planting machine comprises, in combination, a vehicle, and, carried on the vehicle, a digging and planting tool including a tubular member movable between a lower position partially embedded in the ground and an upper position above the ground, and having an open digging and planting tip end, for digging a hole and conveying a plant to the hole; means for moving the tubular member between its lower and upper positions; at least one sensing and signalling means for sensing an abnormal resistance below and/or above a predetermined minimum to penetration of the ground by the digging tip of the tool, thus gauging the condition of the ground, and detecting obstacles to such penetration; and means operatively connected to the signalling means for controlling the movement of the tubular member between its upper and lower positions in response to a signal from the signalling means, so as to abort a digging attempt and promptly start another digging attempt, while in the absence of abnormal resistance to provide a hole of the desired depth.

While at least one sensing and signalling means is necessary, additional sensing and ground-condition-detecting functions can be carried out if two, three or more such sensing and signalling means are provided. Thus, one sensing means can detect too soft a ground condition, indicating sand or mud, by a resistance below a predetermined minimum; another sensing means can detect too hard a ground condition, such as obstacles, by a resistance above a predetermined minimum; and another sensing means can detect an acceptable ground condition.

The time required for the digging and planting tool to carry out a normal digging operation can be controlled by a time relay, which in the absence of a signal of abnormal resistance to penetration of the ground by the digging and planting tool controls can run its full time cycle and so control raising of the tool to its at-rest position after the hole is dug and the plant planted in it. The signalling means can then interrupt the time relay and prematurely cut this time so that the tool immediately returns to the at-rest position when the digging must be aborted.

The sensing and signalling means can be carried on the vehicle together with or separately from the digging and planting tool. If it be with the tool, it can be operatively connected to a reciprocably movable digging tip which is biased towards the ground, and which is moved against the biasing force when a predetermined resistance to penetration of the ground by the tip is encountered. The tip can be made to actuate the sensing and signalling means after having moved a selected distance. If several sensing and signalling means are used, there can be arranged to be actuated in sequence after the tip has moved a selected increment of its full reciprocation.

If the sensing and signalling means be carried on the vehicle in a separate location spaced from the digging and planting tool, then it is operatively connected to a reciprocable feeler means equivalent to the digging tip which is biased towards the ground, and which is moved against the biasing force when a predetermined resistance to penetration of the ground by the feeler means is encountered. The feeler means can be made to actuate the sensing and signalling means after having moved a selected distance. If several sensing and signalling means are used, these can be arranged to be actuated in sequence after the feeler has moved a selected increment of its full reciprocation.

A disadvantage of this kind of machine however, is that the number of plants planted per unit area can vary considerably, and may be quite low in land having many digging obstacles, such as, for example, stony forest land. When the planting unit is moved against the surface of the ground and, in an attempt to dig a hole, it is found that sufficient depth cannot be reached within a given length of time, the unit is raised so as to be free of the ground. A further attempt is made as quickly as possible, but if the sensing means again indicates the presence of an obstacle, such as a stone, the unit is lifted once again, and a further attempt is made to dig a hole of the required depth. After a hole of the desired depth has been dug, and a plant planted there, the vehicle is then moved some distance before the signal is sent for a further hole-digging attempt. When the ground is easily dug, in a planted row, the spacing between two adjacent plants will be at least the spacing for which the machine is programmed, and is determined by a desired or prescribed plant density. When the machine moves over stony ground, however, the spacing may become excessive, since even after a planting operation is finally carried out successfully, the next attempt is not made until the machine has been moved through a distance corresponding to the prescribed spacing.

In reforestation planting, the area must contain the right amount of correctly spaced plants, in order to obtain the best forest stand. This, in the case of Sweden, means that there are 2,500 plants planted in each 10,000 $m^2$ area, even in difficultly planted forest land, in order to avoid expensive manual planting. If the plant spacing is normally 2 meters, variations of between one and three meters can be accepted without detriment to the forest stand.

The digging and planting machine in accordance with the invention overcomes this problem by compensating for any unusually wide spacing between plantings with a closer or unusually narrow spacing in the next planting. If, for example, the spacing of two adjacent plants in a row is 3 meters, the next-following plant in the row is planted at a spacing of 1 meter. This makes it possible to maintain any predetermined plant density per unit area.

The digging and planting machine according to the invention thus automatically maintains a predetermined plant density per unit area, and comprises a vehicle, and, carried on the vehicle, a tubular digging and planting tool; at least one sensing and signalling means for sensing a resistance below and/or exceeding a predetermined value to penetration of the ground by the digging tip of the tool, thus gauging the condition of the ground, and detecting obstacles to such penetration so as to ensure that the digging tip provides and a plant is fed to a planting hole of the desired depth, and a digging attempt is aborted if this be impossible, and comprising an elongated member movable towards and away from the ground in a selected location where a planting hole is to be dug; means biasing the elongated member resiliently towards the ground with a force opposed by the force resisting penetration of the member into the ground, the biasing force being insufficient to prevent movement of the member against the biasing force at a resisting force above a predetermined minimum; drive control means operatively connected to the digging and planting tool to initiate and carry out a normal cyclic digging and planting operation; and, in response to a drive signal, raising and lowering the digging and planting tool towards and away from the ground, and, in response to an abort signal, aborting that digging attempt and causing the digging and planting tool to continue to make hole-digging attempts until a hole of the desired depth has been dug; at least one drive signalling means for sending a drive signal to the drive control means; at least one abort signalling means for sending an abort signal to the drive control means; and at least one abort signal actuating means operatively associated with the elongated member and responding to a predetermined movement of the elongated member as a function of the penetrability of the ground, due to the condition of the ground at that location, by actuating the abort signalling means to give an abort signal to the drive control means indicating that the elongated member has detected a resisting force above the pre-determined minimum showing the digging tip cannot provide a planting hole of the desired depth; at least one sensing and signalling means sensing when a hole of selected depth has been dug, and a plant planted therein; and sending a go-ahead signal to a second measuring means, and to a signal receiving circuit; first measuring and signalling means detecting and measuring sequential unit distances of travel of the vehicle as it moves across the ground, said distances corresponding to a selected spacing between adjacent plants, and for each travelled unit distance sending a first signal to a signal receiving circuit and automatically returning to an initial position; second measuring means detecting and measuring the said unit distances and generating a second signal before the end of said unit distances, said second measuring means responding to said go-ahead signal by returning to an initial position; a signal receiving circuit including a switch means movable between circuit-open and circuit-closed positions, receiving and counting the first signals and the go-ahead signals, and comparing the count of the first signals and go-ahead signals by subtraction to determine the difference between the count of the first signals and the count of go-ahead signals, moving the switch means into a circuit-closed position whenever the difference exceeds a predetermined minimum value, and only then actuating the drive signalling means to send a drive signal to the drive control means, so as to produce said drive signal in dependence on said go-ahead signal, whereby said unit distance and therefore the spacing between plants is reduced after a digging attempt has been aborted, so as to maintain a preselected average plant density.

The drawings illustrate a preferred embodiment of the invention, in which:

FIG. 3 is a perspective view on a larger scale of the digging and planting tool of the machine of FIG. 1;

Figure 5:
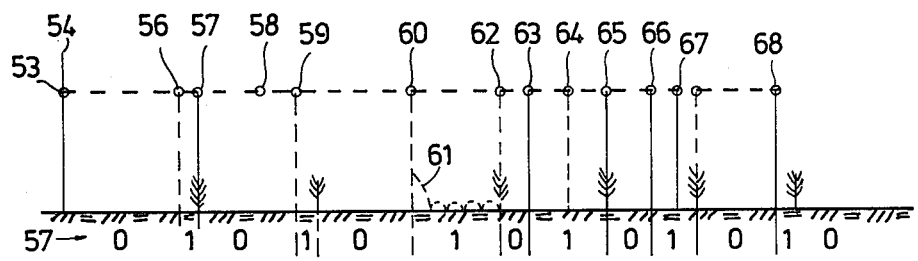

FIG. 4 is a sectional view of the digging and planting tool of FIG. 3, and shows the tool tip in contact with an obstacle in the ground; and FIG. 5 is a time sequence diagram showing the spacing of a digging and planting operation sequence over a given travel distance of the machine over the ground. In FIG. 5 each dash in the dashed line 53 symbolizes one pulse, the spacing between the positions 54 and 56 corresponding to a nominal planting distance. The "pulse" line 53 has been shown to clarify the function of the machine.

Figure 1:
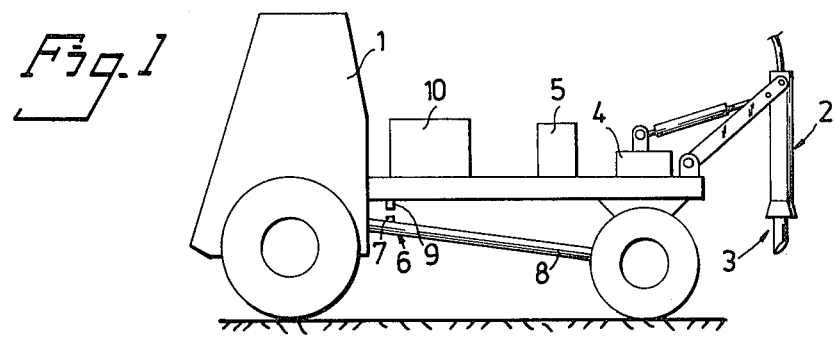
FIG. 1 is a simplified side view of an automatic digging and planting machine according to the invention.

The vehicle 1 seen in FIG. 1 carries at its rear end a digging and planting tool assembly 2, best seen in FIGS. 3 and 4. While this vehicle is provided with only one digging and planting tool assembly 2, such a vehicle can carry two or more digging and planting tools, mounted side-by-side, for the simultaneous regular planting of two or more parallel rows of plants, the distance between the rows being, for example 2 meters. The digging and planting tool 2 has a ground sensing device 3 operative to decide whether a planting location is suitable for planting a plant. In the following it is assumed that a suitable planting location is one in which the dibble or tip of the digging and planting tool is able to form a hole of the desired depth. As disclosed in U.S. Pat. No. 4,273,056, however, soft ground may be unsuitable for planting because, for example, it contains too much water. A planting tool for rejecting the formation of holes in soggy ground is described in the patent, and may, of course, be used in conjunction with the present invention, as can also other kinds of units provided with sensors for indicating whether the ground is suitable for planting or not.

The digging and planting tool is provided with conventional hydraulic or pneumatic operating equipment 4, or equipment operated by other means, driving the digging and planting tool in the digging and planting of plants which operations are controlled from a control unit 5, which is preferably electrical and which controls the digging and planting tools' automatic digging and planting operations.

The vehicle is provided with an odometer connected to the driveshaft or rear wheels or axle, which senses revolutions of the wheels or axle and informs the control unit 5 of the distance travelled by the vehicle. The odometer and control unit 5 order the digging and planting tool to plant plants in accordance with a predetermined spacing.

The odometer can, for example, include a cam 7 mounted on the driveshaft 8 of the vehicle and arranged to actuate a signal transducer 9 for each revolution of the shaft 8. As the vehicle moves along, the transducer emits pulses, each of which corresponds to a selected travel distance. Other odometers, for example, those which measure the number of rotations of one of the wheels of the vehicle, can also be used. The signals produced by the odometer are sent to a control unit 10, which will be described in more detail with reference to FIG. 2.

The digging and planting tool, best seen in FIGS. 3 and 4, has a lifting arm 11, which is mounted on the vehicle for pivotal movement in a vertical direction, and which can be pivoted by means of a hydraulic piston and cylinder 12, pivotably mounted between the vehicle 1 and the lifting arm 11. The digging and planting tool 2 is mounted on the free end of the lifting arm.

The digging and planting tool 2 is arranged to be inserted into the ground by the lifting arm, in order to form holes in the ground and place one plant in each hole. The planting tool has a tubular frame 3 which is flared at the bottom thereof, and on which are fixedly mounted brackets 14, 15. The brackets are pivotably mounted on a transverse shaft 16 fixedly mounted on the lifting arm, and about which the digging and planting tool can be swung in a vertical direction. A tension spring 17 is stretched between the lifting arm and the frame 13, and biases the digging and planting tool obliquely forwardly and downwardly into a position in which the brackets 14, 15 lie against two shoulders 18 on the lifting arm (only one shoulder is shown in the Figures).

The digging and planting tool is connected to a plant magazine arranged on the vehicle, from which plants can be fed via the planting tool into the holes as they are dug via plant discharge means mounted on the planting tool. The plant magazine and the plant discharge means are not shown in the Figures.

A plant conveyor tube 19 is fixedly and concentrically mounted in the frame 13, and is connected at its upper end with a flexible tube 20 made of rubber or some other resilient material, and connected to the plant magazine. The tube 19 extends through the frame 13, and the lower end of said tube projects into the concentric tubular planting dibble 21, which is mounted for axial telescopic movement in the frame. The frame is provided internally with upper and lower annular shoulders 22 and 23, respectively, of which the lower shoulder merges with a cylindrical guide 24 for guiding the dibble during its axial movement. Between the upper shoulder 22 and a flange 25 fixedly mounted on the central part of the dibble are two compression springs 26, 27. These springs bias the dibble to a lower limiting position, in which the flange 25 lies against the lower shoulder 23, and the chamfered outlet opening 28 of the dibble is located well outside the lower end of the frame. Axial telescopic movement of the dibble into the frame 13 against the force of the springs is restricted by their compression limit. At the upper limiting position of the dibble, the lower tip part of the dibble projects out from the lower end of the frame.

When the dibble is displaced upwardly in the frame, an actuator rod 29 fixedly mounted on the dibble after a relatively short distance of travel comes into contact with switch 30 of an electric signal transducer 31, fixedly arranged on the frame. The switch is then displaced to the right and actuates the transducer, which produces a signal. An electric time relay 35 is connected to the transducer and to the operating means 32 of the hydraulic piston and cylinder 12 by means of connecting lines 33, 34. The purpose of the relay will be described later. The operating means 32 comprises magnetic valves, and these and the time relay are of conventional design and thus not described in detail.

In operation, as the vehicle carrying the digging and planting machine moves over the planting area, the digging and planting tool is moved from its upper limiting position above the ground down into the ground, by the hydraulic piston and cylinder 12 and the lifting arm 11, in response to a planting signal sent by the control unit 5 to the operating means 32. The time relay 35 is automatically energized at the same time as the digging and planting tool begins its downward movement, which continues until the dibble 21 reaches the ground and/or comes into contact with an obstacle.

If the nature of the ground and/or the obstacle prevents penetration of the tool into the ground, so that a hole cannot be forced to an extent which enables a hole of the desired depth to be dug, the dibble telescopes into the frame 13, against the force of the springs. The distance through which the dibble is moved into the frame thus constitutes a measure of the hardness of the ground, and the difficulty encountered by the dibble in moving the obstacle to one side or to pass through the obstacle. The compressive force of the springs 26, 27 are thus so chosen that during upward movement of the dibble the pressure rod 29 will come into contact with the switch 30 only when the ground is so hard or the obstacle so difficult to penetrate or to pass by as to preclude any possibility of planting a plant there.

If the ground condition permits the digging and planting tool tip to enter the ground and dig a hole to the intended planting depth, the tool is held temporarily in the hole, while being swung rearwardly at the same time against the action of the spring 17. Shortly after downward movement of the digging and planting tool ceases, the delay time interval of the time relay expires. At that very same moment, the time relay sends a pulse to the plant discharge means, and a plant is discharged through the digging and planting tool into the hole. This pulse also gives a go-ahead signal to the control unit 5. The planting tool then is withdrawn from the ground by the hydraulic piston and cylinder 12, and the lifting arm 11, and is returned to its upper limiting position, above the ground. The operation is then repeated automatically with the aid of conventional means not shown, at a rate which is mainly determined, in the case of ground conditions suitable for planting, by the speed of the vehicle and the desired spacing of the plants.

If, on the other hand, the ground is so hard, or an obstacle in the ground is so difficult to force, as to render planting unsuitable, during downward movement of the digging and planting tool the planting tool is moved up in the frame far enough to cause the pressure rod 29 to reach and actuate the switch 30, thereby activating the transducer, and producing a signal. This signal is passed to the time relay, and to the operating means 32 of the hydraulic piston and cylinder so that the time relay is deactuated and the piston of the piston and cylinder 12 withdrawn. The digging and planting tool is then withdrawn from the ground to an intermediate position, slightly above the surface of the ground, ready to be immediately returned to the ground, in a further hole-digging attempt.

Figure 2:
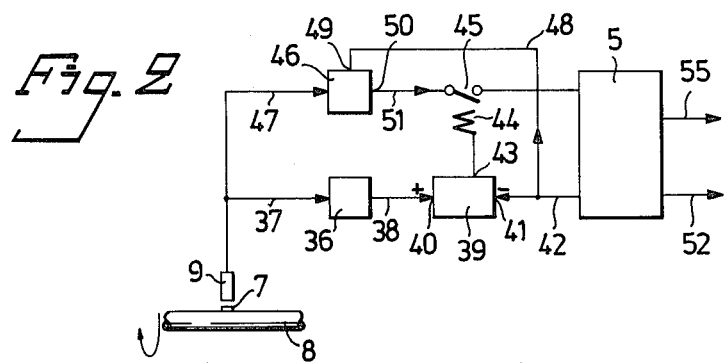
FIG. 2 shows the electric circuits of the machine of FIG. 1, for controlling a digging and planting operation.

FIG. 2 shows the electric circuit of the control unit 10 of FIG. 1. A conventional addition counter 36 of known kind receives pulses from the odometer 7, 9, and together with the odometer form a first measuring means. The counter 36 is an IVO counter type FW 105 sold by IVO Industries, Inc., 1109 Groove Road, P.O. Box 636, Neptune, New York 07753. The counter 36 can be set to count a selected number of pulses corresponding to the distance travelled by the vehicle, which represents the selected spacing of the plants, for example ten pulses, and automatically returns to zero after ten pulses have been counted. Ten pulses may, for example, represent a travel distance of 2 meters. When the counter has counted said ten pulses, received from the transducer 9 over a line 37, the counter sends a short counting signal over a line 38 to the addition input 40 of a conventional addition and subtraction counter 39. Counter 39 is an IVO counter type F 166.55. The counter 39 also has a subtraction input 41, for receiving and subtracting from the addition input total pulses over a line 42 from the control unit 5, corresponding to a successful planting attempt. These are the pulses from the time relay 35. The counter 39 has a signal output 43 for the adjusted pulses total, from which a holding signal is continuously sent to a relay 44 when a pulse has been received by the counter 39 on the addition input 40 and on the subtraction input 41. The relay 44 has a break contact 45. This contact lies closed when the counter 39 has the content "1" and no holding signal is transmitted. When the content of the counter is "0", a holding signal is transmitted, and the relay 44 is energized, whereupon the contact 45 is broken.

A second measuring means comprises the odometer 7, 9 and a settable counter 46, which receives pulses from the transducer 9 over a conductor 47. Counter 46 is an IVO counter type FE 109 marketed by IVO Industries, Inc. Contrary to the counter 36, the counter 46 is not automatically set to zero, but requires the presence of a reset signal, which in this case comprises the go-ahead signal from the time relay 35, this go-ahead signal being passed to the counter 46 via a line 52 and the control unit 5, over a line 48 which is connected to the reset input 49. The counter 46 is set to count, for example, six pulses received from the transducer, and to produce a continuous signal on the output 50 of said counter 46 when this number of pulses has been received. The counter 46 then continues to count the pulses sent by the transducer 9, in parallel with the counter 36. The output 50 of the counter 46 is connected to the control unit 5 over a line 51 and the contact 45.

Thus, before planting operations are begun, both the counter 36 and the counter 46 are set to the desired number of pulses, and the number of pulses set in the counter 46 is always less than the number set in the counter 36. Both counters have the same initial value, which is assumed to be zero.

For purposes of illustration, if the counter 36 is set to count ten pulses, and if each pulse corresponds to 0.2 m, a travel distance of 2 meters is measured before a signal leaves on the line 38. If the counter 46 is set to count six pulses, a distance of 1.2 meters is travelled before the continuous signal is sent on the line 51.

In operation, at the start the vehicle is stationary, and the counters 36, 46 and 39 are set at zero. Since the content of counter 39 is "0", an output signal is sent to the relay 44, and the contact 45 is broken, as illustrated in FIG. 2.

When the vehicle begins to move, the transducer 9 sends signals to the counters 36 and 46. These pulses are represented by the horizontal line 53 in FIG. 5. As seen in FIG. 5, the vehicle moves from the left to the right. The start is at the vertical line 54. When the counters 36 and 46 have received six pulses, the counter 46 will send a signal on line 51, but since the contact 45 is broken, the signal is not transmitted to the control unit 5. When the counter 36, and naturally also the counter 46, have received and counted ten pulses, the counter 36 sends a signal to the addition input of counter 39, whereupon the content of the counter becomes "1". As previously mentioned, this causes the holding signal to the relay 44 to cease, and therewith the contact 45 to be closed.

The signal generated by the counter subsequent to receiving six pulses is now transmitted in the form of a planting signal to the control unit 5, which sends the signal to the operating means 32 via a line 55.

The time relay 35 is started, and a planting attempt made. If the attempt is successful, a go-ahead signal is sent from the time relay 35 of the sensor to the control unit 5 over the line 52, and the control unit 5 sends said signal to the subtraction input 41 of the counter 39 and to the resetting input 49 of the counter 46, to reset the counter 46 to "0". The content of the counter 39 thus becomes "zero", and the relay 44 is magnetized and the contact 45 broken.

When the counter 36 has received ten pulses, it is automatically reset, and begins to count again, from and including the position 56 (FIG. 5). The lower horizontal row 57 in FIG. 5 shows the content of the counter 39 at different points of time.

The vehicle travels to the right, as seen in FIG. 5, and when the counter 46 has again reached the value "6", it generates the signal. The counter is reset and begins a new pulse count when a go-ahead signal is generated, indicating a successful planting attempt. In the present case one pulse has already been counted by counter 36. Thus, the counter 46 will begin its count at position 57, at which position the counter 36 has already counted one pulse. Consequently, when the counter 46 has counted in six pulses, the counter 36 has counted in seven pulses in position 58, and reaches a count of ten pulses at position 59. At position 59, the previously described sequence is repeated, and it is assumed that a plant can be planted.

It will be understood from the foregoing that when the content of counter 39 is "0", it is the output signal of the counter 36 which determines the so-called plant spacing, i.e., the distance between two sequential plants in the row, and that this distance is the selected plant spacing.

During the continued driving of the vehicle, the counter 36 has again counted ten pulses, and a further planting attempt is initiated. If the ground is stony, the contact 30 of the sensor is closed (FIG. 4). The attempt is then stopped, and the unit is raised somewhat, and a further hole digging attempt is made immediately. The broken line 61 indicates the movement of the digging and planting tool during repeated hole-digging attempts. When the position 62 is reached, it is assumed that the planting attempt is successful. The counter 39 therefore changes to "0", and the counter 46 is set to zero and begins to count anew.

In position 62, the counter has counted ten pulses since position 60, and the content of the counter 39 therefore becomes "1", and the contact 45 switches to its closed state. In position 63, however, the counter 46 has only counted three pulses, since position 62. After a further three pulses, however, the counter has reached six pulses in position 64, and the machine has thus moved 1.2 meters since a plant was planted in position 62. The counter 46 generates its go-ahead signal and, since the contact 45 is now closed, a new planting attempt is initiated. It is assumed that this planting attempt is unsuccessful and that the subsequent attempt succeeds and that a plant is planted in position 65, from which position the counter 46 starts to count from its initial counting state.

In position 66, the counter 36 has counted ten pulses from position 62, and the counter 46 has counted four pulses from position 65. After counting a further two pulses, the counter 46 transmits its signal in position 67 and planting takes place. This sequence is repeated, and in position 68 both of the counters 36 and 46 have the requisite number of pulses, and a planting attempt is initiated in response to the counter 36.

It will be seen from the foregoing that when the content of counter 39 is "1", planting will not take place before the counter 46 has counted at least six pulses from the position in which a previous plant was planted.

If the content of the counter 14 is greater than "1", the counter 46 will control the planting sequence until the planting machine works according to a normal spacing, and the number of plants planted equals the number of planting orders given by the counter 36.

In FIG. 5 the positions 56, 59, 60, 63, 66 and 68 correspond to those divisions which coincide with the selected normal spacing between plants. These divisions show that six plants should be planted within the shown distance, which has been achieved.

The instrument panel of the vehicle may conveniently be provided with signal devices, having the form of lamps, for example, which indicate whether plants have been planted at the selected spacing or at a spacing which is less than the selected spacing, and similarly these signals can be registered on a paper strip or the like, so that the planting results can be recorded and evaluated at a later time.

As before mentioned, the machine may be equipped with a plurality of planting units. In this case, each planting unit has its own sensing means 3, and its own control system 5 and 10. If, for example, the machine is equipped with two units and both operate within a section of the ground containing many obstacles, so that the content of respective counters 39 becomes large, due to the receipt of repeated input signals from associated counter 36 without corresponding subtraction signals, or if the content exceeds a given value, it may be suitable for the driver to slow the vehicle down, so that the digging and planting tool can plant plants at a small spacing. This can also be applied so that each distance between plants coincides with a corresponding optimum operating speed. It is, of course, also possible to change the operating speed automatically in response to signals which indicate the plant spacing at which the machine operates.

The described control arrangement can be modified in different ways without departing from the concept of the invention. The counters, which in the illustrated embodiment are assumed to be conventional circuits, may comprise electronic circuits in a programmed data control system, or the like. It is also possible to plant over a range between the normal selected spacing and the smallest acceptable spacing. In this case, the spacing at which the machine operates may suitably be determined in dependence on the content of the counter 39.

The described subtraction and addition counter 39 can be a comparator circuit, arranged to store the number of signals received from the counter 36 and the total number of signals received, so that contact 45 closes when the difference exceeds or is equal to "1". It will be understood that any value whatsoever can be chosen to magnetize and demagnetize the relay 44, in dependence of the number of pulses in respective signals. It has been assumed in the foregoing that the go-ahead signal comprises a short pulse, as does the signal from the counter 36.

Although in the device as shown in the drawings the biasing of the digging and planting tool is by way of compression springs, other biasing means can be used, including, for instance, pneumatic or hydraulic piston and cylinder devices, the latter optionally being connected to a fluid accumulator of conventional type which collects beneath a fixed gas volume, the fluid expelled from the piston cylinder chamber when the piston is forced inwardly by pressure on the piston. The resulting contraction of the gas volume and increase in gas pressure automatically forces the piston out again when inward pressure on the piston is reduced.

The signalling devices can be mechanically- or detent-operated switches of the open and closed circuit type, as shown in the Figures. They can also be of the so-called contact-free switches, i.e., magnetic or inductive switches, so that the button actuator or other types of actuators or mechanical actuating devices can be omitted.

Having regard to the foregoing disclosure, the following is claimed as the inventive and patentable embodiments thereof:

1. A digging and planting machine for digging holes and planting plants therein while automatically maintaining a predetermined plant density per unit of planted area, comprising, in combination, a vehicle, and, carried on the vehicle, a tubular digging and planting tool; at least one sensing and signalling means for sensing a resistance below and/or exceeding a predetermined value to penetration of the ground by the digging tip of the tool, thus gauging the condition of the ground, and detecting obstacles to such penetration so as to ensure that the digging tip provides and a plant is fed to a planting hole of the desired depth, and a digging attempt is aborted if this be impossible, and comprising an elongated member movable towards and away from the ground in a selected location where a planting hole is to be dug; means biasing the elongated member resiliently towards the ground with a force opposed by the force resisting penetration of the member into the ground, the biasing force being insufficient to prevent movement of the member against the biasing force at a resisting force above a predetermined minimum; drive control means operatively connected to the digging and planting tool to initiate and carry out a normal cyclic digging and planting operation; and, in response to a drive signal, raising and lowering the digging and planting tool towards and away from the ground, and, in response to an abort signal, aborting that digging attempt and causing the digging and planting tool to continue to make hole-digging attempts until a hole of the desired depth has been dug; at least one drive signalling means for sending a drive signal to the drive control means; at least one abort signalling means for sending an abort signal to the drive control means; and at least one abort signal actuating means operatively associated with the elongated member and responding to a predetermined movement of the elongated member as a function of the penetrability of the ground, due to the condition of the ground at that location, by actuating the abort signalling means to give an abort signal to the drive control means indicating that the elongated member has detected a resisting force above the predetermined minimum showing the digging tip cannot provide a planting hole of the desired depth; at least one sensing and signalling means sensing when a hole of selected depth has been dug, and a plant planted therein; and sending a go-ahead signal to a second measuring means, and to a signal receiving circuit; first measuring said signalling means detecting and measuring sequential unit distances of travel of the vehicle as it moves across the ground, said distances corresponding to a selected spacing between adjacent plants, and for each travelled unit distance sending a first signal to a signal receiving circuit and automatically returning to an initial position; second measuring means detecting and measuring the said unit distances and generating a second signal before the end of said unit distances, said second measuring means responding to said go-ahead signal by returning to an initial position; a signal receiving circuit including a switch means movable between circuit-open and circuit-closed positions, receiving and counting the first signals and the go-ahead signals, and comparing the count of the first signals and go-ahead signals by subtraction to determine the difference between the count of the first signals and the count of go-ahead signals, moving the switch means into a circuit-closed position whenever the difference exceeds a predetermined minimum value, and only then actuating the drive signalling means to send a drive signal to the drive control means, so as to produce said drive signal in dependence on said go-ahead signal, whereby said unit distance and therefore the spacing between plants is reduced after a digging attempt has been aborted, so as to maintain a preselected average plant density.

2. A digging and planting machine according to claim 1 in which the first and second measuring means are set to produce signals after measuring selected distances along the path travelled by the vehicle.

3. A digging and planting machine according to claim 1 in which the signal receiving circuit comprises a counter circuit arranged to add received first signals and to subtract therefrom received go-ahead signals.

4. A digging and planting machine according to claim 3 in which the signal receiving circuit produces a signal for opening the switch when the number of first signals received is the same as the number of go-ahead signals received.

5. A digging and planting machine according to claim 4 comprising a relay controlled by the signal receiving circuit and opening and closing the switch means.

6. A digging and planting machine according to claim 1 in which the vehicle comprises an odometer connected to the driveshaft or rear wheels or axle sensing revolutions of the wheels or axle and informing the drive control means of the distance travelled by the vehicle, and thereby ordering the digging and planting tool to plant plants in accordance with a predetermined spacing.

7. A digging and planting machine according to claim 6 in which the odometer includes a cam mounted on the driveshaft of the vehicle and actuating a signal transducer for each revolution of the shaft, the transducer emitting pulses as the vehicle moves along, each pulse corresponding to a selected travel distance.

8. A digging and planting machine according to claim 1 in which the sensing and signalling means comprises an elongated member movable towards and away from the ground in a selected location where a planting hole is to be dug and biased resiliently towards the ground with a force opposed by the force resisting penetration of the member into the ground, the biasing force being insufficient to prevent movement of the member against the biasing force at a resisting force above a predetermined minimum, and signalling means responding to such movement as a function of the penetrability of the ground due to the condition of the ground at that location, and giving a signal.

9. A digging and planting machine according to claim 8 in which such movement actuates a detent which actuates the signalling means.

10. A digging and planting machine according to claim 9 in which the signalling means is an electric switch and gives an electric signal.

11. A digging and planting machine according to claim 8 in which the elongated member is arranged for movement in a substantially vertical direction and has a lower end adapted to engage the ground, and reciprocably moveable with respect to the elongated member, and which is biased towards the ground, and has at least one signalling device and at least one detent arranged for actuation by contact with the lower end of the elongated member upon encountering a resisting force above the predetermined minimum.

12. A digging and planting machine according to claim 11 comprising a plurality of signalling devices and detents actuated in sequence by the lower end as it is displaced, each device being actuated and signalling a ground condition corresponding to the resisting force required to move the lower end to that actuating position.

13. A digging and planting machine according to claim 8 in which the elongated member comprises a planting tube and its lower end a digging tip, and a plant feeding means connected to a plant supply and to the planting tube for feeding a plant to a hole formed by the digging tip in the ground.

14. A digging and planting machine according to claim 8 in which the elongated member is a feeler member and is in operative connection with a digging and planting tool.

15. A digging and planting machine according to claim 8 having at least one time relay operatively connected with the sensing and signalling means, the time relay being arranged to be energized and deenergized by the signalling means, and control means responsive to one of (a) expiration of the time delay interval and (b) an interruption of the time delay interval to initiate one of (A) a further attempt to dig a hole and (B) the feeding of a plant to the planting hole.

16. A digging and planting machine according to claim 8, in which the biasing force is provided by a spring.

17. A digging and planting machine according to claim 8 having two sensing and signalling means, each detecting different ground conditions.

18. A digging and planting machine according to claim 17 in which one sensing means detects too soft a ground condition, by a resistance below a predetermined minimum; and the second sensing means detects too hard a ground condition by a resistance above a predetermined minimum.

19. A digging and planting machine according to claim 8 having three sensing and signalling means, each detecting different ground conditions.

20. A digging and planting machine according to claim 19 in which one sensing means detects too soft a ground condition, by a resistance below a predetermined minimum; the second sensing means detects too hard a ground condition by a resistance above a predetermined minimum; and the third sensing means detects an acceptable ground condition.

21. A digging and planting machine according to claim 8 having a time relay controlling the time required for the digging and planting tool to carry out a normal digging operation, which in the absence of a signal of abnormal resistance to penetration of the ground by the digging and planting tool runs its full time cycle and then controls raising of the tool to an at-rest position after the hole is dug and the plant planted in it; and having the signalling means arranged to interrupt the time relay and prematurely cut this time so that the tool immediately returns to the at-rest position when the digging must be aborted.

22. A digging and planting machine according to claim 8 comprising means for compacting earth about the plant after it has been deposited in the hole; and means for moving the digging and planting tool and the compacting means separately and together between ground-elevated and ground-contacting positions.

23. A digging and planting machine according to claim 8 comprising closure means movable between a first position closing off the open tip end of the digging and planting tool for digging a hole, and a second position exposing the open end for delivery of a plant from the planting tool into the hole.

* * * * *